Figure 1:
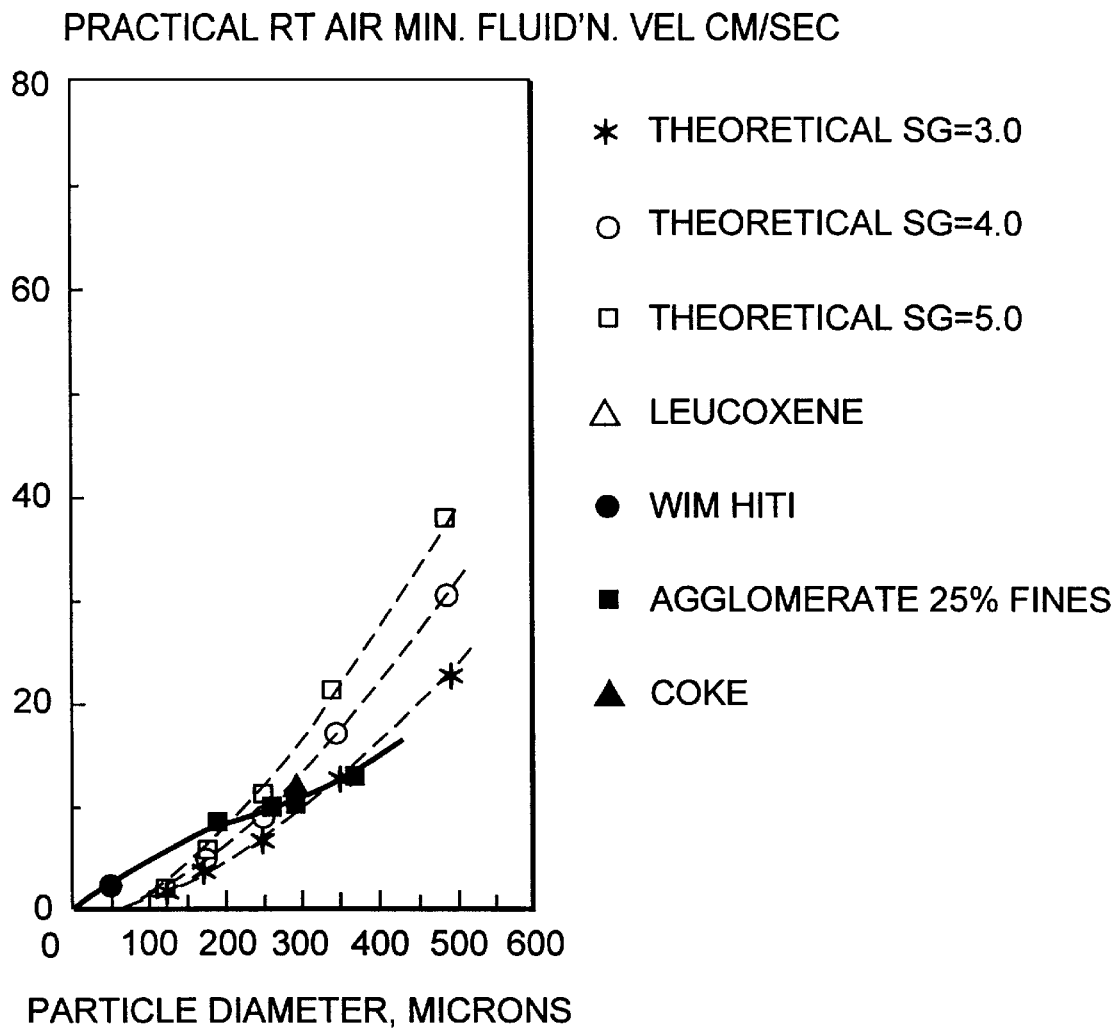

United States Patent
Hall et al.

[11] Patent Number: 6,149,712
[45] Date of Patent: Nov. 21, 2000

[54] SINTERED HIGH TITANIUM AGGLOMERATES

[75] Inventors: John Sydney Hall, Malvern; Ken George Carey, Bayswater; Michael John Hollitt, Box Hill North, all of Australia

[73] Assignee: Commonwealth Scientific & Industrial Research Organisation, Canberra, Australia

[21] Appl. No.: 08/820,132

[22] Filed: Mar. 19, 1997

Related U.S. Application Data

[62] Continuation of application No. 08/221,445, Apr. 1, 1994, abandoned, which is a continuation of application No. 07/646,765, filed as application No. PCT/AU89/00315, Jul. 25, 1989, abandoned.

[30] Foreign Application Priority Data

Jul. 26, 1988 [AU] Australia .................................. PI 9487

[51] Int. Cl.$^7$ ...................................................... C22B 1/14
[52] U.S. Cl. .................................. 75/767; 75/768; 75/769; 264/117; 264/669; 264/670; 423/598
[58] Field of Search ............................. 264/63, 669, 670, 264/117; 423/598; 75/767, 768, 769

[56] References Cited

U.S. PATENT DOCUMENTS

| | | | |
|---|---|---|---|
| 2,277,733 | 3/1942 | Wainer et al. | 501/134 |
| 2,576,380 | 11/1951 | Woodcock et al. | 501/134 |
| 3,502,460 | 3/1970 | Martin | 423/598 |
| 3,644,113 | 2/1972 | Lang | 75/321 |
| 3,823,009 | 7/1974 | Lailach et al. | |
| 3,860,414 | 1/1975 | Lang | 75/321 |
| 3,961,005 | 6/1976 | Sparks | 264/117 |
| 4,120,694 | 10/1978 | Elger | 423/598 |
| 4,187,117 | 2/1980 | Gueguin | 501/99 |

FOREIGN PATENT DOCUMENTS

| | | |
|---|---|---|
| 726451 | 3/1955 | United Kingdom . |
| 1217274 | 5/1968 | United Kingdom . |

OTHER PUBLICATIONS

Condensed Chemical Dictionary, 1961, Reinhold Pub. Corp. New York, pp. 1025–1026.
Robert H. Perry, Chemical Engineers Handbook McGraw Hill Book Company, New York, 5$^{th}$ Edition, 1973, p. 8–63.
Noda, Titanium From Slag In Japan, Jan. 1965, Journal of Metals, pp. 25–32.
Riquier, Agglomeration and Selective Separation of an Ilmenite Concentrate, Metallurgie, 16, (1976).
Solheim, Ilmenite Smelting in Norway, 7th "Industrial Minerals" Congress, pp. 93–97 and 2 pages of abstracts.

*Primary Examiner*—James Derrington
*Attorney, Agent, or Firm*—Finnegan, Henderson, Farabow, Garrett and Dunner, L.L.P.

[57] ABSTRACT

A process for increasing the particles size of fines of a titaniferous mineral containing more that 45% by weight of titanium. The process comprises mixing the fines with a binding agent and water to produce an agglomerate. The agglomerate is then dried and sintered.

16 Claims, 2 Drawing Sheets

SINTERED HIGH TITANIUM AGGLOMERATES

This application is a continuation, of application Ser. No. 08/221,445, filed Apr. 1, 1994, now abandoned, which is a Continuation of 07/646,765 filed Mar. 15, 1991, now abandoned, which is a national phase application of PCT/AU89/00315 filed Jul. 25, 1989.

The present invention relates to agglomerates of titanium-bearing material suitable for producing $TiCl_4$.

In prior art processes, materials of high titanium dioxide content (above 85% $TiO_2$) are the preferred raw materials for $TiCl_4$ manufacture, subject to specifications on the particle size of the materials and on the content of some impurity elements.

$TiCl_4$ is a low boiling liquid which may be purified by distillation and chemical methods, following which it may be burned in oxygen to generate $TiO_2$ pigment and chlorine gas, or reacted with magnesium or electrolysed to produce titanium metal.

The raw material, a titanium-bearing mineral sized within the range 100–300 microns ($\mu m$), is fed to a fluidised bed reactor where it undergoes reductive chlorination at temperatures in the range 900°–1000° C. Petroleum coke or a similar high fixed carbon material is added to the bed as both fuel and reducing agent. Oxygen may be added to the inlet stream to maintain reaction temperatures. The product $TiCl_4$ passes from the reactor in a gaseous form together with the gaseous chlorides of impurity elements and entrained fine solid particles from the fluid bed. The gases are cleaned of solids and condensed. The product $TiCl_4$ is purified by distillation and chemical methods.

In the chlorination stage, most metallic impurities form volatile chlorides, which leave the reactor in the $TiCl_4$ gas stream. However, the alkali and alkaline earth metals form relatively non-volatile chlorides which are liquid at reaction temperatures and hence tend to form agglomerated masses in the bed to the point of potential shut down. Accordingly, operators of the process usually specify stringent limitations on the contents of these elements in raw materials.

Impurities such as iron represent an economic penalty to the process in that they consume coke for their reduction and, more importantly, expensive reagent chlorine which is lost in waste iron chlorides. Silicon and aluminium are also partly chlorinated in the process, causing excess chlorine consumption. Aluminium chlorides are also the source of corrosion problems in process equipment.

As a mineral particle is progressively chlorinated, it reduces in size until it reaches a point at which it is entrained in the gas stream and leaves the reactor as an unavoidable and irrecoverable loss. Conventionally, entrainment losses may amount to 5–10% of the input materials. As the feed size is reduced below 150 $\mu m$ in diameter, entrainment losses become relatively much higher than for materials of the conventional size. Such losses are both economically and operationally acceptable.

In an attempt to overcome these difficulties, in one process known in the prior art, fine-grained $TiO_2$-bearing material for fluidised bed chlorination is prepared by coking into composite agglomerated particles a mixture of $TiO_2$-bearing material, bituminous coking coal and a water soluble binder. This prior-art process, however, has not been accepted by the industry. One reason is that the chlorination process is reductive chlorination and so the carbon in the feed material must be present in a specific proportion to the $TiO_2$-bearing material which may not be suited to composite strength development. Further, the agglomerate, because the carbon is attacked, breaks down before complete chlorination occurs and so fine particle size material is lost to the process through entrainment in the gas stream.

In another process described in the prior art, a water emulsion of asphalt is used as a binder in the formation by extrusion of pellets of fine-grained titanium-bearing material. By a process of slow curing at 1000° C., water is removed from the pellets and the organic material converted to carbon. The curing results in the caking of the binder in the pores and around the grains, forming a good bond. There is no chemical bond between the binder and the titanium-bearing material. The extruded material must be broken before curing into a size range close to the required product size. This removes the need for the circulation of cured fines which would otherwise reduce the strength of the product pellets. During chlorination of the pellets, the carbon takes part in the reductive chlorination process. This product therefore suffers from the same disadvantages as those described in the previous example of the prior art.

It is an object of the present invention to overcome one or more of the perceived difficulties in the fluid bed chlorination of fine grained titanium-bearing materials.

Accordingly, the present invention provides a process for increasing the particle size of fines of a titaniferous mineral containing more than 45% by weight titanium which process comprises:

mixing the fines with a binding agent and water to produce an agglomerate, drying the agglomerate and sintering it.

The agglomerated particles so formed are resistant to degradation forces associated with transport and handling. The agglomerated particles are also resistant to the physical and chemical degradation forces and temperatures associated with chlorination processing including fluidised bed reductive chlorination processing.

The agglomerated particles, may be manufactured to fall within a preferred size range to suit the dynamic requirements of fluidised bed reductive chlorination processing for example between 100–500 $\mu m$, more preferably from approximately 150–250 $\mu m$. If particles fall below this range they may be entrained in the gas stream and therefore lost to the reaction. If particles fall above this range they may cease to be buoyant within the fluidised bed and form an inactive layer at the bottom of the reactor.

The titanium-containing particles may be of any suitable titanium-containing mineral or minerals. The titanium-containing minerals may be natural or synthetic in origin. The titanium-containing mineral may be a detrital mineral. The titanium may be present in the titanium-containing minerals in the form of titanium dioxide. The titanium dioxide content of the titanium-containing minerals may be approximately 85% by weight or greater. A preferred titanium dioxide containing source is a deposit which includes any of the minerals rutile, anatase and leucoxene.

The titanium-containing minerals may be subjected to initial concentration processing after extraction. Initial concentration processing may increase the average titanium dioxide content for example to approximately 90% by weight or above.

One titanium-containing mineral deposit at Horsham, Victoria, Australia of this type is further characterized by usually fine sizing. The unusually fine sizing suggests that major entrainment losses may ensue from later treatment by reductive chlorination in a fluid bed.

The titanium-containing mineral may be present in any suitable amount in the agglomerated particles. The titanium-containing minerals may be present in amounts of approximately 95–99.5% by weight based on the total weight of the sintered agglomerate.

The amount of water added may vary depending upon the size distribution of the original titanium-containing particles and the required size of the agglomerates. The amount of water may vary from approximately 5 to 15% by weight, preferably approximately 8% by weight, based on the total weight of titanium-containing particles, binder and water.

The binder or binders for the titanium-containing particles may be of any suitable type. The binder for the titanium-containing particles should be such as to form agglomerates capable of withstanding the physical, chemical and thermal degradation forces in the drying and firing stages of the process. The binder may be an organic or inorganic binder. The binder may be a ceramic or glass-forming binder. The binder may be a carbon-free binder. A single binder may be used. A combination of two or more binders may be used to provide strength under the different operating environments of the drying and firing stages.

Calcium- or sodium-containing binders are not preferred. This is so since the calcium or sodium contents of the binder may react in the reductive chlorination process to form deleterious liquid residues. Binders may contain calcium or sodium but should not result in the addition of these elements to cause problems in chlorination.

The binder for the titanium-containing minerals may be such that it does not seriously contaminate the bound titanium-bearing particles for subsequent processing, for example in reductive chlorination processing.

The binder for the titanium-containing particles may include:

1) Colloidal silica
2) Silica, water soluble silicates or silica/fluorite mixtures
3) Clay minerals (including bentonite, kaolinite and montmorillonite)
4) Boehmite
5) Boehmite/silica mixture
6) Geothite
7) Lignosulphonate
8) Sodium carbonate (saturated water solution)
9) Sodium silicate
10) Group II element carbonate/clay mineral mixture
11) Sugars e.g. molasses
12) Aluminium salt/organic amide mixtures
13) Titanium bearing organic and inorganic solutions
14) Polyvinyl acetate
15) Water emulsified organic binders The amount of binder for titanium-containing particles should be sufficient to produce a competent agglomerate. The amount of binder should preferably not be sufficient to encapsulate the titanium-containing particles. A relatively low percentage of binder is preferred. Percentages in the range of approximately 0.5–5% by weight are preferred.

The mixing step in the process according to the present invention may be conducted in any suitable manner. Agglomeration may be conducted in devices incorporating a rolling/tumbling action such as rotating disk or drum pelletisers or V-blenders, or in devices incorporating an impacting/shearing action such as high intensity micro-agglomerators or mixers, or in devices incorporating both actions. Agglomeration may be conducted in stages or in closed circuit with product sizing screens.

The drying step may be conducted at elevated temperatures e.g. 75 to 150° C. The drying step is preferably carried out in such a manner as to limit the residence time of the agglomerates in this part of the process to less than 30 minutes. The drying step may be conducted in any suitable drying apparatus. A fluidised bed dryer or rotary dryer may be used.

In the firing step, the temperature and residence time should be sufficient to produce homogeneous or heterogenous phase bonding between the particles within the agglomerates. The agglomerates may be heated to a temperature of approximately 1000° C. to 1500° C. preferably 1200° C. to 1400° C. The residence time of the agglomerates within the above temperature range may be for a period of approximately 5 minutes to approximately 6 hours.

The firing step may be carried out in any of a number of suitable means, including fluidised bed, oven or kiln firing.

In a preferred form of the present invention the process may include the preliminary step of grinding at least a portion of the titanium-containing particle source.

The preliminary grinding step may be utilised to improve the size control in the preparation of the agglomerates and thus provide a greater strength and density to the fired product. The titanium particles may be introduced into any suitable grinder. A ball mill or rod or intensive milling device may be used.

The amount of titanium-containing feed to be ground may vary from 0 to approximately 100% by weight depending on the source and type of titanium-containing material.

The grinding step may provide particles having an average size from approximately 1 um to approximately 50 um.

The sintered agglomerate may include a plurality of sintered agglomerated particles. The bond formed between the titanium-containing particles may include particle boundary recrystallisation, that is the boundaries of the titanium-containing particles may be physically merged. The bond formed between the titanium-containing particles may in addition include a bridging with a secondary phase formed by the binder. The sintering step may tend to reduce or eliminate the binder from the agglomerated particles. The initial binder may be burned off in whole or in part. The initial binder may be present and/or may be incorporated in whole or in part in the crystal lattice of the particles.

The present invention will now be more full described with reference to the accompanying examples. It should be understood, however, that the description following is illustrative only and should not be taken in any way as a restriction on the generality of the invention described above.

EXAMPLE 1

A laboratory scale batch Patterson-Kelley V-blender was used initially to blend a mixture of 9.2 kg of dry leucoxene with 1% of dry bentonite powder for 1 to 2 minutes. The leucoxene consisted of 75% in the size range 50 $\mu$m–100 $\mu$m and 25% in the size range –50 $\mu$m. The size distributions of the two fractions are recorded in Tables 1 and 2.

TABLE 1

| Size Distribution of Ground and Sized Leucoxene (–100 + 50 $\mu$m) | |
|---|---|
| SIZE ($\mu$m) | CUMULATIVE % PASSING |
| 106 | 95.0 |
| 75 | 36.4 |
| 53 | 8.2 |
| 38 | 0.9 |

TABLE 1-continued

Size Distribution of Ground and Sized Leucoxene
(−100 + 50 μm)

| SIZE (μm) | CUMULATIVE % PASSING |
|---|---|
| 33 | 0.6 |
| 24 | 0.1 |
| 17 | 0.1 |
| 8 | 0.0 |
| 5 | 0.0 |

TABLE 2

Size Distribution of −50 μm Fraction of Ground Leucoxene

| SIZE (μm) | CUMULATIVE % PASSING |
|---|---|
| 106 | 100.0 |
| 75 | 99.6 |
| 53 | 99.1 |
| 38 | 90.4 |
| 33 | 88.6 |
| 24 | 59.6 |
| 17 | 33.2 |
| 8 | 10.1 |
| 5 | 0.0 |

The V-blender rotated at a speed of 40 rpm. Water was then introduced into the mixture through an intensifier bar rotating within the blender shell at a speed of 1500–3000 rpm. The intensifier bar served both to shear the solids and to spray the water into the charge in a finely divided form. The amount of water added was about 8% of the solids weight and the time required for its addition was about 4 minutes. A further 1 to 2 minutes mixing time was allowed for the microagglomerates to achieve final size and compaction.

The product was then discharged onto a large tray, spread out and oven dried at 80° C. for 48 hours to ensure that drying was complete.

The dried product was then sieved to a size range of 125–500 μm. A 100 g sample of the micro agglomerates was placed on a ceramic dish and heated for 25 minutes at 1260° C. The sintered product was then subjected to several physical and chemical tests considered appropriate for determining its suitability as a feed material for reductive chlorination processing.

Visual inspection of the microagglomerates after sintering revealed two obvious changes by comparison with the dried but unsintered material. Firstly, some shrinkage had occurred, either by a reduction in the internal voids of the microagglomerates or by a reduction of the intergranular voidage of the agglomerate mass on sintering. Secondly, the colour of the material changed from a greyish brown to a reddish brown. Furthermore, the material assumed a glassy or reflective appearance in comparison to the dull surface of unfired material.

Microscopic examination of the sintered product showed dense packing of the particles within the microagglomerates with abundant bridging between particles. Electron microprobe analysis revealed no compositional differences between the material comprising the bridges and that of the particles. No appreciable degradation or agglomerate-agglomerate adhesion was observed as a result of firing. X-ray diffraction analysis of the fired microagglomerates indicated major rutile and pseudobrookite phases, i.e., crystalline phases which could be formed from the original leucoxene alone.

The size of the product after firing was as shown in Table 3.

TABLE 3

Size of Sintered Leucoxene Product from 75% −110 + 50 μm and 25% −50 μm feed agglomerated with 1% Bentonite Binder and fired for 25 minutes at 1260° C.

| SIZE (μm) | CUMULATIVE % PASSING |
|---|---|
| 500 | 100.0 |
| 355 | 97.4 |
| 250 | 78.7 |
| 180 | 27.4 |
| 125 | 0.0 |

A "strength test" was performed on the microagglomerates as follows; a microagglomerate was placed between two glass slides and weights were added until the microagglomerate first failed. Failure first occurred at greater than 1 kg (i.e., approximately 10 N) for 300 μm agglomerates. Fracture fragments were of similar size, i.e., there was little or no tendency to dusting. Calculations indicate that for the recorded strength it would be possible to store agglomerates without failure due to compressive forces in piles or storage bins of approximately 50 m in height.

A more quantitative and reproducible test for resistance to abrasion was determined by violently shaking one gram of a closely sized fraction of microagglomerates (−335+250 μm for 5 minutes in a cylindrical tube 18 mm i.d. and 50 mm long with 3 ceramic balls 8 mm in diameter. During this test, the material was subjected to both impact and attrition. The average particle diameter after this test had reduced from 303 μm to 170 μm. This compares with the performance of a similar sample of the original leucoxene material which reduced to 220 μm.

It may be concluded that the microagglomerates represent an industrially useful material from the points of view of storage and transport.

Small samples (10 g) of microagglomerates were subjected to fluidised bed chlorination tests in a laboratory scale reactor at temperatures between 950 and 1100° C. The results showed that at greater than 50% completion of chlorination:

(1) There was no indication of preferred attack on intergranular bonds. Rather the bonds appeared relatively more inert than the main mass of the individual mineral grains:

(2) Where the titania of the microagglomerates had been partially removed, an unreacted core of material of original appearance (apart from colour bleaching) remained within the microagglomerates. The pores of the affected outer shell were noticeably increased in size.

Table 4 provides initial and final size distributions for fired agglomerates which were taken to 89% completion of chlorination in laboratory fluidised bed tests. There is clearly little generation of −90 μm material in chlorination, suggesting that high degrees of chlorination may be achieved without bond degradation or losses from reactors as fines carried in off gases. Similar results were obtained at up to 95% completion of chlorination.

TABLE 4

FLUIDISED BED CHLORINATION OF MICROAGCLOMERATES

Fluidising Conditions:

| | |
|---|---|
| Temperature | 1090° C. |
| Time | 70 min |
| Chlorine Flowrate | 1000 ml/min |
| Calculated Gas velocity in bed | 0.35 m/s |
| Bed Height | 10 mm |
| Feed Weight | 10 g |
| Bed Residue | 0.9 g |
| Carryover | 0.25 g |
| % Chlorinated | 88.5% |

| SIZE RANGE | FEED | | BED PRODUCT | |
|---|---|---|---|---|
| (μm) | g | % | g | % |
| +425 | 0.64 | 6.4 | — | — |
| −425 +355 | 3.24 | 32.4 | — | — |
| −355 +300 | 3.25 | 32.5 | 0.10 | 11.1 |
| −300 +250 | 2.16 | 21.6 | 0.16 | 17.8 |
| −250 +180 | 0.33 | 3.3 | 0.29 | 32.0 |
| −180 +90 | 0.37 | 3.7 | 0.35 | 38.9 |
| −90 | 0.01 | 0.1 | — | — |
| TOTAL | 10.00 | 100 | 0.90 | 100 |

The fluidisation performance of the microagglomerates was measured as a function of size and compared with the behaviour of theoretical spheres, petroleum coke and beach sand leucoxene. The results, plotted as practical minimum fluidisation velocity in room temperature air against average particle diameter, are presented in FIG. 1. These results suggest higher than expected minimum fluidisation velocities at smaller particle diameters and lower than expected minimum fluidisation velocities at larger particle diameters. This behaviour may be explained partly by size distribution effects and partly by density and surface shape and roughness effects. It suggests that the chlorination process may be able to accept significantly larger agglomerate particles than is the case with conventional feeds, so affording the possibility of improved process recoveries.

EXAMPLE 2

Approximately 10 kg of ground leucoxene were agglomerated and dried in the manner described in Example 1.

The microagglomerates were fed to a small pilot scale fluidised bed furnace in which the bed temperature was maintained at a temperature of 1260° C. The operating parameters of the furnace were:

| | |
|---|---|
| bed diameter | 30 cm |
| windbox temperature | 1000° C. |
| windbox fuel | LPG |
| bed fuel | coconut husk char |
| superficial gas velocity in fluidised bed | 71 cm sec$^{-1}$ |
| agglomerate feed rate | 22 kg hr$^{-1}$ |

In order to control both temperature and superficial gas velocity within the bed at the desired range it was found necessary on this small equipment to enrich the inlet air with oxygen.

The average residence time of the material within the bed was approximately 20 minutes.

Figure 2:
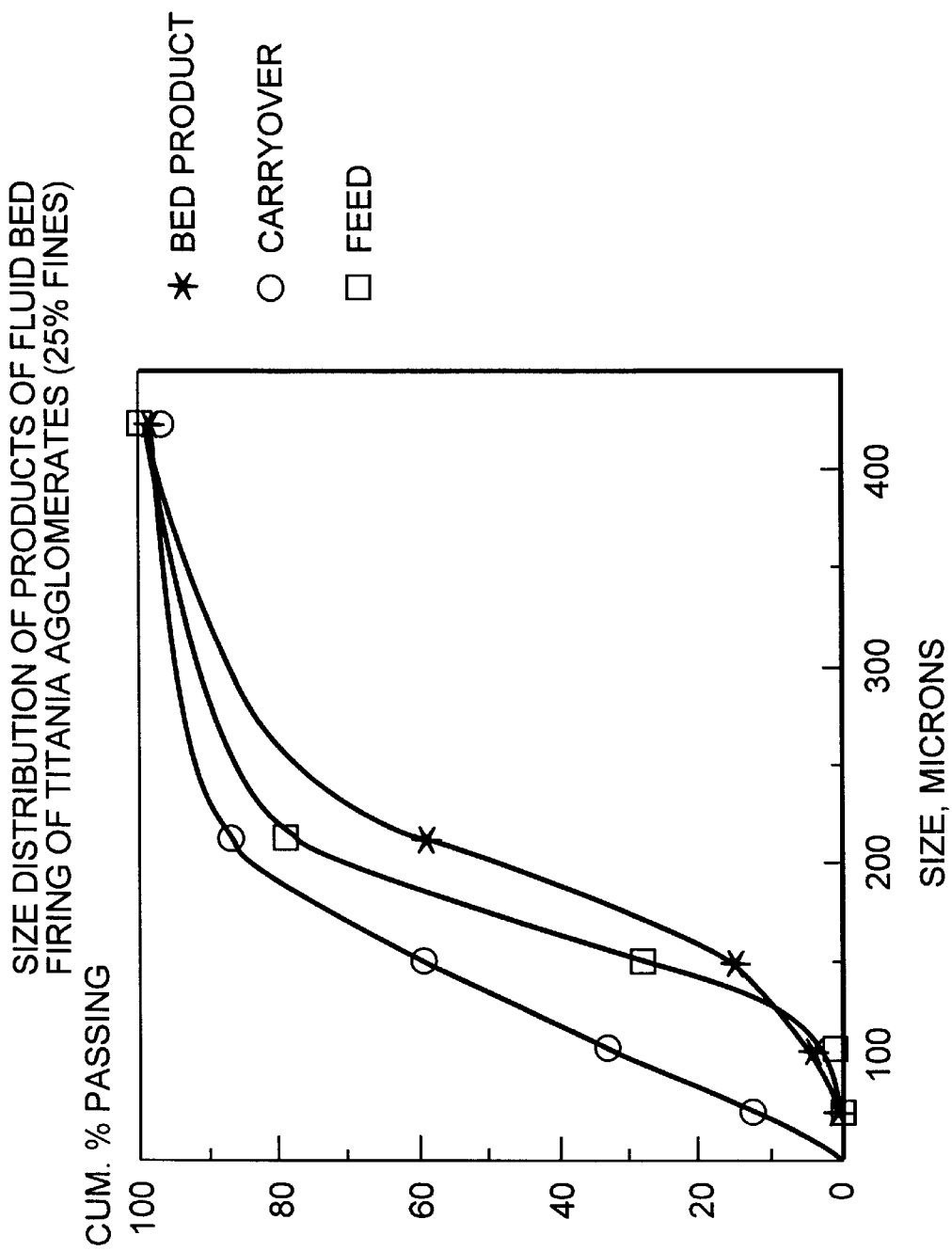

The amount of bed material lost by entrainment in the off-gas was estimated at 4.5%. The size distributions of feed, product and carryover material were as shown in FIG. 2.

The product was subjected to the abrasion-attrition test described in Example 1. The result showed a reduction in average particle size from 303 μm to 190 μm.

EXAMPLE 3

Agglomeration tests were carried out on a sample of rutile flour with the following size distribution:

TABLE 5

Size Distribution of Rutile Flour

| Size (μm) | Cumulative % Passing |
|---|---|
| 128 | 100 |
| 96 | 98.8 |
| 64 | 88.6 |
| 48 | 80.2 |
| 32 | 58.6 |
| 24 | 42.0 |
| 16 | 33.5 |
| 12 | 27.1 |
| 8 | 22.3 |
| 6 | 18.4 |
| 4 | 16.0 |
| 3 | 12.4 |
| 2 | 10.5 |
| 1.5 | 9.9 |
| 1 | 9.1 |

Agglomeration was performed in an industrial "Flexomix" agglomerator, manufactured by Schugi Process Engineers of Lelystad, Netherlands at a solids feed rate of 840 kg per hour. Bentonite was premixed with the feed at 1% addition and lignosulphonate was added as a 33% solution at 2.8 kg solids per hour. Moisture input in addition to lignosulphonate addition was 1 L min$^{-1}$.

After continuous passage through the agglomerator and a fluid bed drying unit 67.5% of the product was in the size range +125–500 μm. Product coarser than 125 μm diameter as collected for subsequent kiln based firing.

Firing of the agglomerates was conducted in a 3.6 m long 0.23 m internal diameter counter current oil fired rotary kiln. At a rotation speed of 2 rpm and slope of one degree the agglomerate residence time in the 1260° C. high temperature zone was approximately 20 minutes. A total of 60 kg of agglomerates was fired in the kiln at a feed rate of 16.2 kg per hour.

Fine material in the feed and degraded material formed in firing were swept from the kiln by combustion gases, providing 69% recovery of feed in kiln products. Feed and product particle size distributions are recorded below:

TABLE 6

Size Distribution of Feed to and Product of Kiln Firing

| | Cum % Retained | |
|---|---|---|
| Size (μm) | Feed | Fired Product |
| 850 | 9.07 | 6.67 |
| 600 | 19.65 | 16.31 |
| 425 | 32.20 | 30.86 |
| 300 | 46.85 | 50.62 |
| 212 | 67.11 | 82.82 |
| 150 | 91.25 | 98.89 |

TABLE 6-continued

Size Distribution of Feed to and Product of Kiln Firing

| | Cum % Retained | |
|---|---|---|
| Size (μm) | Feed | Fired Product |
| 106 | 96.09 | 99.19 |
| 75 | 97.51 | 99.21 |
| −75 | 100.00 | 100.00 |

Continuous agglomeration trials were performed in an industrial blender manufactured by Patterson Kelley Pty. Ltd. of Pennsylvania, U.S.A. The ground leucoxene feed had the particle size distribution indicated below:

TABLE 7

Particle Size Distribution of Ground Leucoxene

| Size (μm) | Cum % Passing |
|---|---|
| 212 | 99.5 |
| 150 | 91.2 |
| 106 | 61.0 |
| 75 | 44.2 |
| 53 | 34.5 |
| 38 | 25.9 |

The blender was fed with ground leucoxene at 0.6 tonnes per hour with addition of bentonite at 6 kg per hour and organic binder (PVA) at 1.5 kg per hour. Moisture was added as 10% of feed weight via sprays mounted on the shaft of a set of high speed rotating blades within the agglomeration chamber. Mineral residence time in the agglomerator was approximately 20 minutes.

The agglomerated product was dried in a tubular dryer to a maximum temperature of 80° C.

The particle size distribution of the dried product is indicated below:

TABLE 8

Size Distribution of Dried Agglomerates

| Size (μm) | Cum % Passing |
|---|---|
| 1000 | 100.0 |
| 840 | 97.6 |
| 590 | 93.4 |
| 420 | 84.4 |
| 250 | 55.5 |
| 150 | 27.6 |
| 105 | 14.1 |
| 75 | 7.6 |

The dried agglomerated product was fed at 73 kg per hour to a 1250° C. fluidised bed firing unit. The fluidised bed firing unit had a diameter of 0.46 m and a height (above the distributor plate) of 0.56 m. The fluidising gas was the air rich combustion product of propane. Distillate was atomised into the base of the fluidised bed to provide additional heat by combustion with the oxygen remaining in the fluidising gases. Average residence time of the agglomerates in the fluidised bed was approximately 60 minutes.

Fine material present in the feed and generated in fluidised bed firing was entrained in exiting combustion gases and removed via a hot cyclone. Only 17% of the feed reported in this "blowover" stream.

The particle size distributions of the fluidised bed fired agglomerates and blowover are provided below:

TABLE 9

Size Distribution of Products of Firing

| | Cum % Retained | |
|---|---|---|
| Size (μm) | Product | Blowover |
| 850 | 3.78 | — |
| 600 | 6.50 | — |
| 425 | 12.24 | — |
| 250 | 26.42 | — |
| 150 | 51.52 | — |
| 106 | 86.05 | 7.25 |
| 53 | 96.89 | 64.47 |

What is claimed is:

1. A process for increasing the particle size of fines of a titaniferous mineral to be fed into a fluidised bed reactor containing more than 45% by weight titanium, which process comprises:

agglomerating said fines with a binding agent and water to produce an agglomerate, the amount of said binding agent being in the range of 0.5 to 5% by weight of the agglomerate, wherein said binding agent is colloidal silica, silica, water soluble silicates or silica/fluorite mixtures, clay minerals, Boehmite, Boehmite/silica mixture, lignosulphonate, sodium carbonate, sodium silicate, Group II element carbonate/clay mineral mixtures, sugars, aluminum salt/organic amide mixtures, polyvinyl acetate or water emulsified organic binders drying the agglomerate, and sintering the dried agglomerate at a temperature from 1000 to 1500° C. to produce a sintered agglomerate having an average particle size from about 100 to 500 microns.

2. The process of claim 1, wherein the binder is capable of forming a glass or of exhibiting ceramic sintering properties when the agglomerate is sintered.

3. The process of claim 1, wherein the binding agent is selected from the group consisting of silica, colloidal silica, a water soluble silicate, a silica/fluorite mixture, bentonite, kaolinite, montmorillonite, boehmite, a boehmite/silica mixture, lignosulphonate, a saturated aqueous solution of sodium carbonate, sodium silicate, a Group II element carbonate/clay mineral mixture, molasses, an aluminum salt/organic amide mixture, polyvinyl acetate, and water emulsified organic binders.

4. The process of claim 1, wherein the binding agent is bentonite.

5. The process according to claim 1, wherein the agglomerate is formed by mixing said fines, binding agent and water with impacting shearing action.

6. The process of claim 1, wherein the binding agent comprises from 0.5 to 5% by weight based on the total weight of the fines and the binding agent on a dry weight basis.

7. The process of claim 1, wherein the water comprises from 5 to 15% by weight based on the total weight of the fines, binding agent and water.

8. The process of claim 1, wherein the agglomerate is dried for up to 30 minutes at a temperature in the range from 75 to 150° C.

9. The process of claim 1, wherein the agglomerate is sintered at a temperature of from 1200 to 1400° C. for from 5 minutes to 6 hours.

10. The process of claim 1, wherein the titaniferous mineral comprises a mixture of said fines and coarse particles.

11. The process of claim 1, wherein said fines are first ground prior to mixing them with the binding agent and water.

12. The process of claim 11, wherein the fines are ground to particles having an average size in the range from 1 to 50 µm.

13. The process of claim 1 wherein the sintered agglomerates have an average particle size of 150 to 250 µm.

14. The process of claim 1, wherein the mineral is a detrital mineral.

15. The process of claim 1, wherein the mineral contains more than 85% by weight of titanium dioxide.

16. The process of claim 1, wherein the mineral is selected from the group consisting of rutile, anatase or leucoxene.

* * * * *